(12) United States Patent
Honda et al.

(10) Patent No.: US 7,140,427 B2
(45) Date of Patent: Nov. 28, 2006

(54) VEHICLE AIR CONDITIONER WITH DEFROSTING OPERATION IN EXTERIOR HEAT EXCHANGER

(75) Inventors: Keita Honda, Okazaki (JP); Kunio Iritani, Anjo (JP)

(73) Assignee: DENSO Corporation, Kariya (JP)

( * ) Notice: Subject to any disclaimer, the term of this patent is extended or adjusted under 35 U.S.C. 154(b) by 299 days.

(21) Appl. No.: 10/229,191

(22) Filed: Aug. 27, 2002

(65) Prior Publication Data

US 2003/0037562 A1     Feb. 27, 2003

(30) Foreign Application Priority Data

Aug. 27, 2001   (JP)   ............... 2001-256153

(51) Int. Cl.
*B60H 1/32*  (2006.01)
*B60H 1/00*  (2006.01)
*B60H 3/00*  (2006.01)
*F25B 29/00* (2006.01)

(52) U.S. Cl. ............ 165/202; 165/240; 165/241; 165/231; 62/160; 62/324.5; 62/324.6; 62/238.7; 237/2 B; 237/12.3 B

(58) Field of Classification Search ............ 165/240, 165/241, 242, 202, 231; 62/160, 324.5, 324.6, 62/238.7; 237/2 B, 12.3 B
See application file for complete search history.

(56) References Cited

U.S. PATENT DOCUMENTS 6,164,367 A * 12/2000 Kurahashi et al. ............ 165/42

FOREIGN PATENT DOCUMENTS

| JP | 7-266862 | 10/1995 |
| JP | 8-258546 | 10/1996 |
| JP | 10175415 A * | 6/1998 |

* cited by examiner

*Primary Examiner*—John K. Ford
(74) *Attorney, Agent, or Firm*—Harness, Dickey & Pierce, PLC

(57) ABSTRACT

In a vehicle air conditioner for heating a passenger compartment by a heater core and a heat pump cycle, when operation of a heat pump cycle is switched from a defrosting operation to a heating assist operation, a heating degree of the heater core is increased higher than a predetermined heating degree. Further, when the operation of the heat pump cycle is switched from the defrosting operation to the heating assist operation, an air outlet mode except for a defrosting mode for defrosting a windshield is set. Further, in the defrosting operation of the heat pump cycle, the temperature of an interior heat exchanger of the heat pump cycle is set higher.

20 Claims, 12 Drawing Sheets

VEHICLE AIR CONDITIONER WITH DEFROSTING OPERATION IN EXTERIOR HEAT EXCHANGER

CROSS-REFERENCE TO RELATED APPLICATION

This application is related to and claims priority from Japanese Patent Application No. 2001-256153 filed on Aug. 27, 2001, the content of which is hereby incorporated by reference.

BACKGROUND OF THE INVENTION

1. Field of the Invention

The present invention relates to a vehicle air conditioner for heating a passenger compartment using both of a heater core and a heat pump cycle. The heat core heats air using exhaust heat generated from the vehicle as a heating source. More particularly, the present invention relates to a control of the vehicle air conditioner, when operation of the heat pump cycle is switched from a defrosting operation to a heating operation.

2. Description of Related Art

In a vehicle air conditioner, air to be blown into a passenger compartment is heated in a heater core using hot water (engine-cooling water) as a heating source. In the vehicle air conditioner, when the temperature of the water flowing into the heater core is low, the temperature of air blown into the passenger compartment is reduced, and a necessary heating capacity cannot be obtained. Accordingly, recently, a heat pump cycle is combined with the heater core for improving the heating capacity. That is, when a necessary heating capacity cannot be obtained only by the heater core, a heating operation is performed by operating an interior heat exchanger of the heat pump cycle as a radiator. When the heating operation is performed in the heat pump cycle, a surface of the exterior heat exchanger is readily frosted. When the heat pump cycle is operated while the surface of the exterior heat exchanger is frosted, heat absorption efficiency of the exterior heat exchanger is reduced. In this case, generally, a defrosting operation of the exterior heat exchanger is performed by operating the exterior heat exchanger as a radiator.

On the other hand, after a predetermined time (e.g., one hour) passes after starting an engine, the temperature of hot water is increased, and the necessary heating capacity can be obtained only by the heater core. Accordingly, the heating operation in the heat pump cycle becomes unnecessary at about a time where the surface of the exterior heat exchanger is frosted, for example. Even in this case, when an outside air temperature is equal to or lower than 0° C., because the frost formed once on the surface of the exterior heat exchanger does not melt, the defrosting operation of the exterior heat exchanger is needed to be performed before the heat pump cycle is operated next.

However, when the defrosting operation of the exterior heat exchanger is performed, condensed water is formed on the surface of the interior heat exchanger due to heat absorption of the interior heat exchanger. Then, when the operation of the heat pump cycle is switched from the defrosting operation to the heating operation in such a case where the temperature of the hot water is again reduced, the condensed water on the interior heat exchanger is evaporated due to heat radiation of the interior heat exchanger. Therefore, a windshield of the vehicle may be fogged.

SUMMARY OF THE INVENTION

In view of the above-described problems, it is an object of the present invention to restrict a windshield from being fogged when a heating operation is switched from a defrosting operation in a heat pump cycle of a vehicle air conditioner that heats a passenger compartment by the heat pump cycle and a heater core. The heater heats air using exhaust heat generated in a vehicle.

It is another object of the present invention to improve a driving safety in the vehicle.

According to the present invention, in a vehicle air conditioner, air to be blown into a passenger compartment is heated by a heater core and a heat pump cycle. The heater core heats air to be blown into the passenger compartment by performing a heat-exchange between the air and a fluid having recovered exhaust heat generated in the vehicle. The heat pump cycle including an interior heat exchanger for performing a heat-exchange between a refrigerant and the air to be blown into the passenger compartment, and an exterior heat exchanger for performing a heat-exchange between the refrigerant and outside air. Further, a control unit controls operation of the heat pump cycle to switch one of a heating assist operation where the interior heat exchanger radiates heat to heat the air together with the heater core, and a defrosting operation where the exterior heat exchanger is defrosted using heat radiated from the exterior heat exchanger while the interior heat exchanger absorbs heat from the air. In the vehicle air conditioner, the control unit sets a heating degree of the heater core to be higher than a predetermined heating degree when the operation of the heat pump cycle is switched to the heating assist operation from the defrosting operation. Accordingly, when the heat assist operation is set from the defrosting operation in the heat pump cycle, the temperature of air blown into the passenger compartment becomes higher than a predetermined temperature. In this case, since a relative humidity of air blown into the passenger compartment becomes smaller, it can effectively restrict a windshield from being fogged.

In the present invention, for increasing the heating degree of the heater core to be higher than the predetermined heating degree when the heating assist operation is set from the defrosting operation in the heat pump cycle, a rotational speed of the engine is set higher than a predetermined rotational speed, or a flow amount of the fluid supplied into the heater core is set more than a predetermined flow amount, or the fluid is made to bypass a radiator for cooling the fluid, or an opening degree of an air mixing door for opening the heater core is increased to be higher than a predetermined degree, or a target temperature of air to be blown into a passenger compartment of the vehicle is set higher than a predetermined temperature.

Alternatively, the control unit has a mode setting member for setting one of a defroster mode where air is blown into the passenger compartment toward a front windshield of the vehicle and the other mode where air is blown into the passenger compartment toward a seat side different from the front windshield. In this case, when the operation of the heat pump cycle is switched to the heating assist operation from the defrosting operation, the other mode is set by the mode setting member. Accordingly, even when humidified air is blown into the passenger compartment, it can prevent the humidified air from directly flowing toward the windshield, and fogging on the windshield can be restricted.

Preferably, in the defrosting operation, the control unit controls the operation of the heat pump cycle such that the temperature of the interior heat exchanger becomes higher than a set temperature. Therefore, heat absorption capacity in the exterior heat exchanger can be restricted in the defrosting operation, and it can restrict condensed water from being adhering on the exterior heat exchanger. Accordingly, it can effectively restrict the windshield from being fogged.

Alternatively, the control unit has fogging determining means for determining whether or not a windshield of the vehicle is difficult to be fogged. In this case, when the fogging determining means determines that the windshield is difficult to be fogged, it is determined that a condition for switching the operation of the heat pump cycle from the defrosting operation to the heating assist operation is satisfied. Alternatively, the control unit has stop-state determining means for determining whether or not the vehicle is stopped for a long time longer than a predetermined time period. In this case, when the stop-state determining means determines that the vehicle is stopped for the long time, it is determined that a condition for switching the operation of the heat pump cycle from the defrosting operation to the heating assist operation is satisfied. Accordingly, it can effectively restrict the windshield from being fogged, and a driving safety relative to the fogging in the windshield can be improved.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Embodiments of the present invention will be described hereinafter with reference to appended drawings.

(First Embodiment)

Figure 1:
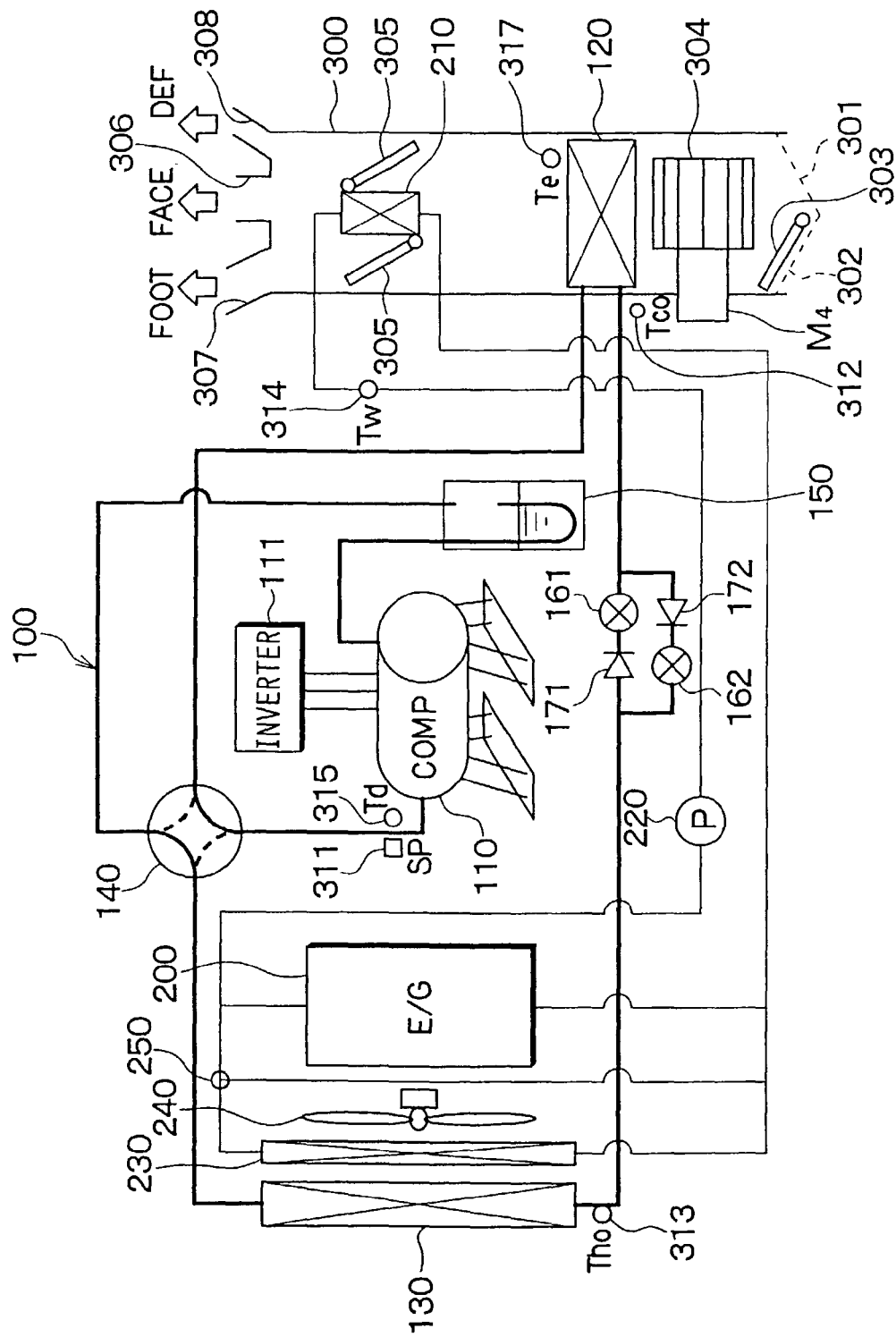
FIG. 1 is a schematic diagram showing a vehicle air conditioner according to a first embodiment of the present invention.

In the first embodiment, an air conditioner of the present invention is typically used for a hybrid vehicle driven by electric power of a battery and driving force of an engine. In the vehicle air conditioner shown in FIG. 1, a refrigerant cycle system is constructed by a heat pump cycle 100 capable of switching any one of a cooling operation (defrosting operation) and a heating operation. Further, an engine 200 is disposed for driving the vehicle.

An electric compressor 110, for sucking and compressing refrigerant, is controlled by an inverter 111. An interior heat exchanger 120 is disposed to perform a heat exchange between refrigerant and air to be blown into a passenger compartment, and an exterior heat exchanger 130 is disposed to perform a heat exchange between the refrigerant and outside air. A four-way valve (switching valve) 140 switches any one of a case where refrigerant discharged from the compressor 110 flows toward the interior heat exchanger 120 and a case where refrigerant discharged from the compressor 110 flows toward the exterior heat exchanger 130. An accumulator (gas-liquid separator tank) 150 separates refrigerant into gas refrigerant and liquid refrigerant, and stores the separated liquid refrigerant excessive in the heat pump cycle while the separated gas refrigerant is introduced into a suction side of the compressor 110.

An electric cooling decompression device 161 decompresses refrigerant flowing out from the exterior heat exchanger 130 in the cooling operation. An electric heating decompression device 162 decompresses refrigerant flowing out from the interior heat exchanger 120 in the heating operation. Open degrees of the decompression devices 161, 162 are controlled by an electronic control unit described later. A first check valve 171 is disposed to prevent refrigerant from flowing into the cooling decompression device 161 in the heating operation. A second check valve 172 is disposed to prevent refrigerant from flowing into the heating decompression device 162 in the cooling operation.

An air-conditioning case 300 defines an air passage through which air flows into the passenger compartment. An inside air inlet 301 for introducing air (i.e., inside air) inside the passenger compartment and an outside air inlet 302 for introducing air (i.e., outside air) outside the passenger compartment are provided in the air-conditioning case 300 at a most upstream air side. An inside-outside air switching door 303 is disposed to open and close both the inlets 301, 302, and a centrifugal type blower 304 is disposed to blow the sucked air from the inlets 301, 302 into the passenger compartment.

In the air-conditioning case 300, the interior heat exchanger 120 is disposed at a downstream air side of the blower 304, and a heater core 210 is disposed at a downstream air side of the interior heat exchanger 120. The heater core 210 heats air using engine-cooling water (hot water, fluid) having recovered exhaust heat generated in the engine 200. The cooling water from the heater core 210 flows through a radiator 230 by operation of an electric pump 220, and is cooled in the radiator 230 by outside air blown from an electric exterior fan 240. A water switching valve 250 is disposed to switch any one of a case where cooling water flowing out from the engine 200 flows into the radiator 230 and a case where the cooling water from the engine 200 bypasses the radiator 230. An air mixing door (i.e., air-temperature adjusting device) 305 adjusts a heating degree of air to be blown into the passenger compartment by adjusting a flow ratio between an air amount flowing through the heater core 210 and an air amount bypassing the heater core 210.

Figure 2:
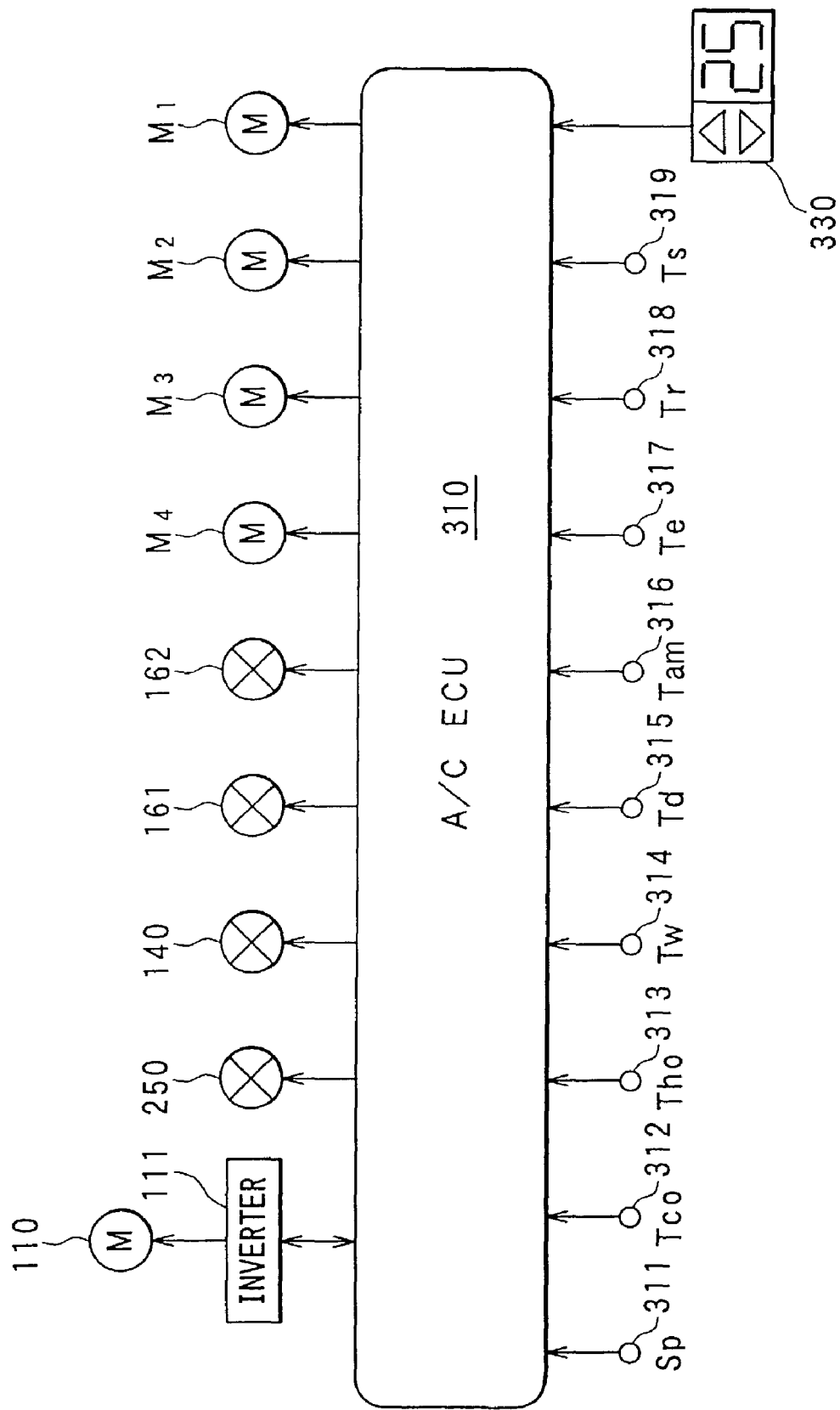
FIG. 2 is a schematic diagram showing a control unit of the vehicle air conditioner according to the first embodiment.

A face opening 306 for blowing conditioned air toward the upper half body of a passenger in the passenger compartment, a foot opening 307 for blowing conditioned air toward the foot portion of the passenger, and a defroster opening 308 for blowing conditioned air toward an inner surface of a windshield (not shown) are provided in the air-conditioning case 300 at a downstream air side of the air mixing door 305 and the heater core 210. Further, blow-mode switching doors (not shown) for opening and closing the openings 306-308 are disposed in the air-conditioning case 300 at the direct upstream air sides of the openings 306–308, respectively. The blow-mode switching doors, the air mixing door 305 and the inside-outside air switching door 303 are driven servomotors (driving devices) M1–M3, and the servomotors M1–M3 are controlled by the electronic control unit (ECU) 310 shown in FIG. 2. A blow mode (air outlet mode) can be switched by controlling the servomotor M1 among a defroster mode where air is blown toward the windshield, a face mode where air is blown toward the upper half body of the passenger, a foot mode where air is blown toward the foot portion of the passenger and the like. By controlling the servomotor M2, an air introduction mode can be switched between an inside air introduction mode where inside air is introduced from the inside air inlet 301 and an outside air introduction mode where outside air is introduced from the outside air inlet 302.

Further, detection values from sensors 311–319 and set values from a temperature control panel 330 are output to the ECU 310. A discharge pressure sensor 311 detects a pressure Sp of refrigerant discharged from the compressor 110. An interior outlet temperature sensor 312 detects a temperature Tco of refrigerant flowing out from the interior heat exchanger 120, and an exterior outlet temperature sensor 313 detects a temperature Tho of refrigerant flowing out from the exterior heat exchanger 130. A water temperature sensor 314 detects a temperature Tw of cooling water (hot water) to be supplied into the heater core 210, and a discharged refrigerant temperature sensor 315 detects a temperature Td of refrigerant discharged from the compressor 110. An outside air temperature sensor 316 detects an outside air temperature Tam, and a post interior temperature sensor 317 detects a temperature Te of air directly after passing through the interior heat exchanger 120. An inside air temperature sensor 318 detects an inside air temperature Tr, and a sunlight sensor 319 detects an amount Ts of sunlight radiated into the passenger compartment. A desired air temperature Tset in the passenger compartment is input to the temperature control panel 330 by a passenger.

The ECU 310 controls the blow-mode switching doors (servomotor M1), the air mixing door 305 (servomotor M2), the inside-outside air switching door 303 (servomotor M3), the blower 304 (servomotor M4), the decompression devices 161, 162, the switching valve 140, the water switching valve 250, in accordance with a beforehand set program, based on the detection values of the sensors 311–319 and the set temperature Tset set to the temperature control panel 330.

Figure 3:
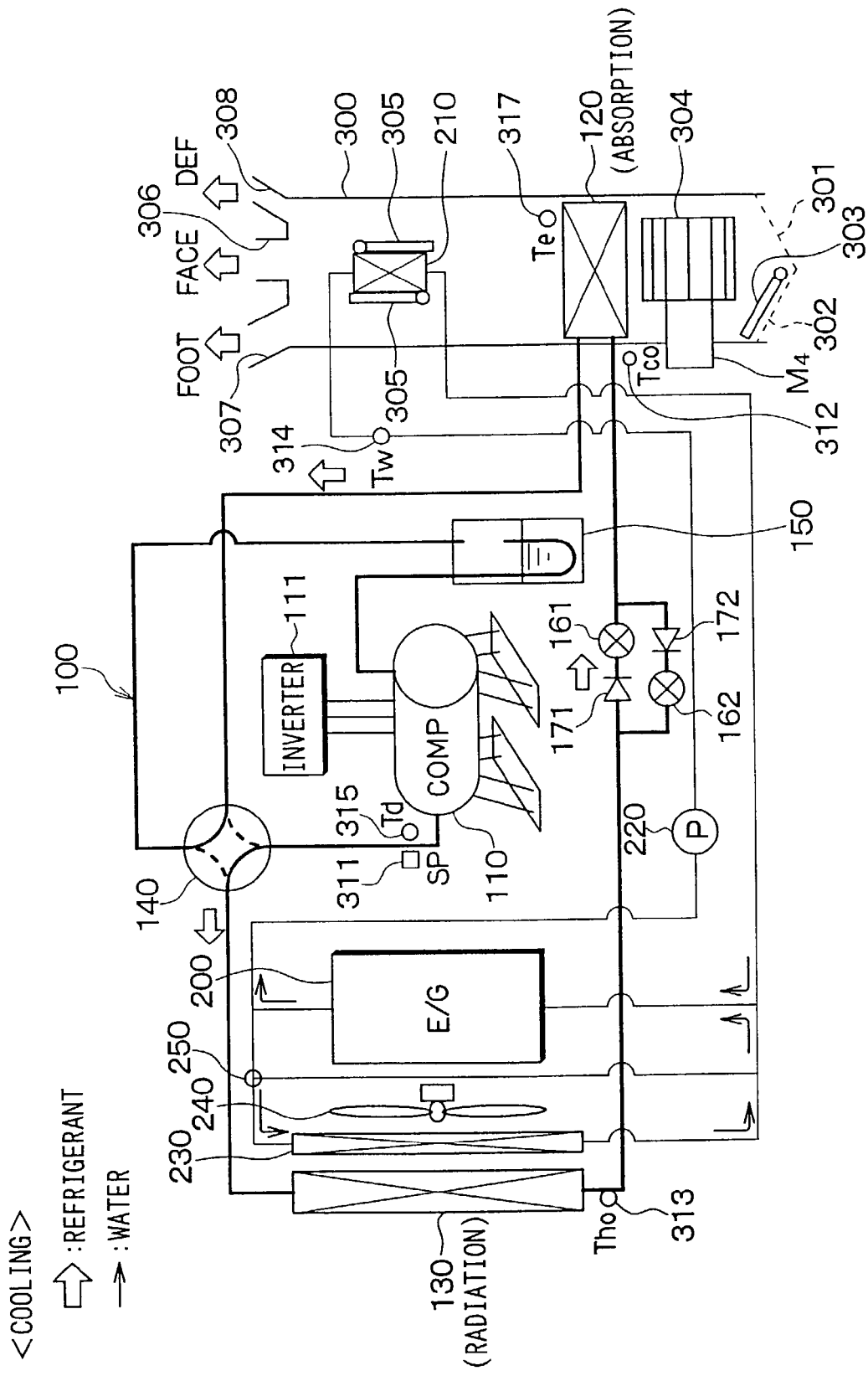
FIG. 3 is a schematic diagram showing the vehicle air conditioner in a cooling operation, according to the first embodiment.

Next, operation of the vehicle air conditioner according to the first embodiment will be described. When the cooling operation is set, a cooling operation switch (not shown) is turned on, and a core surface of the heater core 210 is closed by the air mixing door 305 as shown in FIG. 3. Then, refrigerant, discharged from the compressor 110, flows into the side of the exterior heat exchanger 130, while all air, having passed through the interior heat exchanger 120, bypasses the heater core 210. Thus, refrigerant from the compressor 110 circulates in the heat pump cycle 100 through the exterior heat exchanger 130, the cooling decompression device 161, the interior heat exchanger 120 and the accumulator 150, in this order, and returns into the compressor 110. Refrigerant is evaporated by absorbing heat from air to be blown into the passenger compartment in the interior heat exchanger 120, so that air passing through the interior heat exchanger 120 is cooled. Thereafter, the evaporated refrigerant is cooled by outside air in the exterior heat exchanger 130, and is condensed therein.

On the other hand, cooling water is circulated by the electric pump 220 and the water switching valve 250 into the heater core 210 and the radiator 230 as indicated by arrows in FIG. 3. In the air-conditioning case 300, since air, cooled by the interior heat exchanger 120, bypasses the heater core 210, the cooled air (cool air) is supplied into the passenger compartment. At this time, the temperature of air to be blown into the passenger compartment is controlled by controlling the operation (e.g., rotational speed) of the compressor 110.

Specifically, at first, a target air temperature TAO to be blown into the passenger compartment, that is, a target temperature (target interior air temperature TEO) of air directly after passing through the interior heat exchanger 120 is calculated based on the following formula (1) using the set temperature Tset, the inside air temperature Tr detected by the inside air temperature sensor 318, the outside air temperature Tam detected by the outside air temperature sensor 316, and the sunlight amount Ts radiated into the passenger compartment, detected by the sunlight sensor 39.

$$TEO = Kset \times Tset - Kr \times Tr - Kam \times Tam - Ks \times Ts + C \quad (1)$$

Here, Kset, Kr, Kam and Ks are control gains, respectively, and C is a correction constant.

Then, the rotational speed of the compressor 110 is inverter-controlled, so that the temperature Te of air directly after passing through the interior heat exchanger 120, detected by the post interior air temperature sensor 37 becomes the target interior air temperature TEO.

Figure 4:
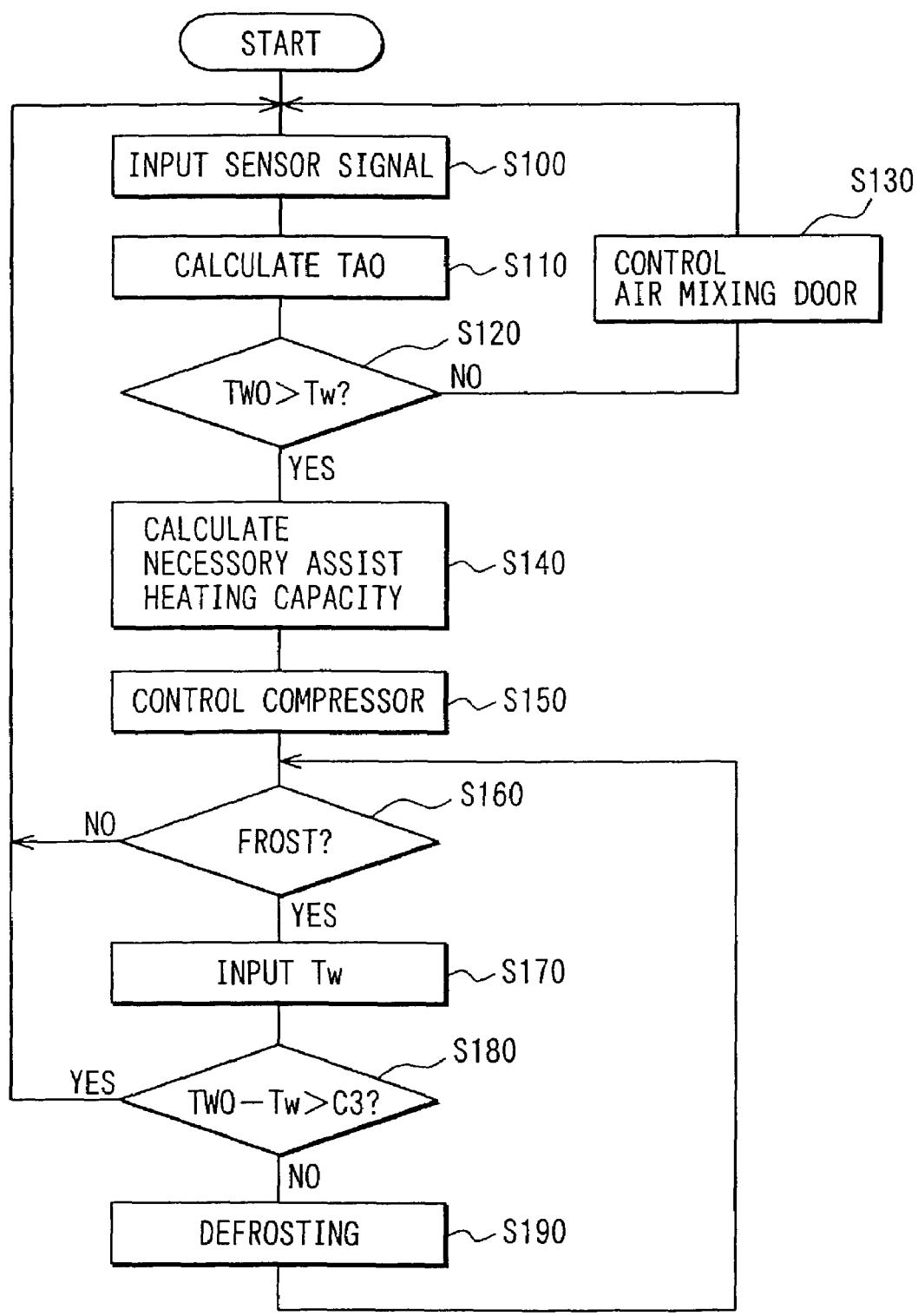
FIG. 4 is a flow diagram showing an operation control of the vehicle air conditioner according to the first embodiment.

On the other hand, when the heating operation is set, operation control is performed based on the flow diagram shown in FIG. 4. When a heating operation switch (not shown) is turned on, detection signals are output from the sensors 311–319 to the ECU 310 at step S100. Next, at step S110, the target air temperature TAO, that is, the temperature of air directly after passing through the heater core 210, corresponding to the target water temperature TWO, is calculated based on the following formula (2) using the detection vales.

$$TWO = Kset \times Tset - Kr \times Tr - Kam \times Tam - Ks \times Ts + C \quad (2)$$

Here, Kset, Kr, Kam and Ks are control gains, respectively, and C is a correction constant.

Although formula (1) is identical to formula (2), Kset, Kr, Kam, Ks and C in the cooling operation (formula 1) are different from those in the heating operation (formula 2), respectively. At step S120, it is determined whether or not the target water temperature TWO is higher than a water temperature Tw supplied to the heater core 210. The water temperature Tw is a detection temperature detected by the water temperature sensor 314. When the determination at step S120 is NO (i.e., TWO≦Tw), it is determined that the passenger compartment can be sufficiently heated only using the exhaust heat from the engine 200. In this case, at step S130, an open degree SW of the air mixing door 305 is determined, and the temperature of air to be blown into the passenger compartment is adjusted by controlling the flow ratio between the air amount passing through the heater core 210 and the air amount bypassing the heater core 210 in accordance with the open degree of the air mixing door 305.

When the determination at step S120 is YES (i.e., TWO>Tw), it is determined that the passenger compartment cannot be sufficiently heated only using the exhaust heat from the engine 200, that is, it is determined that the exhaust heat amount is deficient for heating air in the heater core 210. In this case, air is also heated by radiating heat from the interior heat exchanger 120 in a heating assist operation. Specifically, at step S140, a necessary assist heating capacity required in the heating assist operation of the heat pump cycle is calculated using the target water temperature TWO and the detected actual water temperature Tw. At step S150, the rotational speed of the compressor 110 is inverter-controlled so that the temperature Te of air directly after passing through the interior heat exchanger 120, detected by the interior temperature sensor 317 corresponds to the necessary assist heating capacity calculated at step S140. That is, at steps S140 and S150, the heating assist operation is performed in the interior heat exchanger 120 of the heat pump cycle, so that the insufficient heating in the heater core 210 is assisted.

Figure 5:
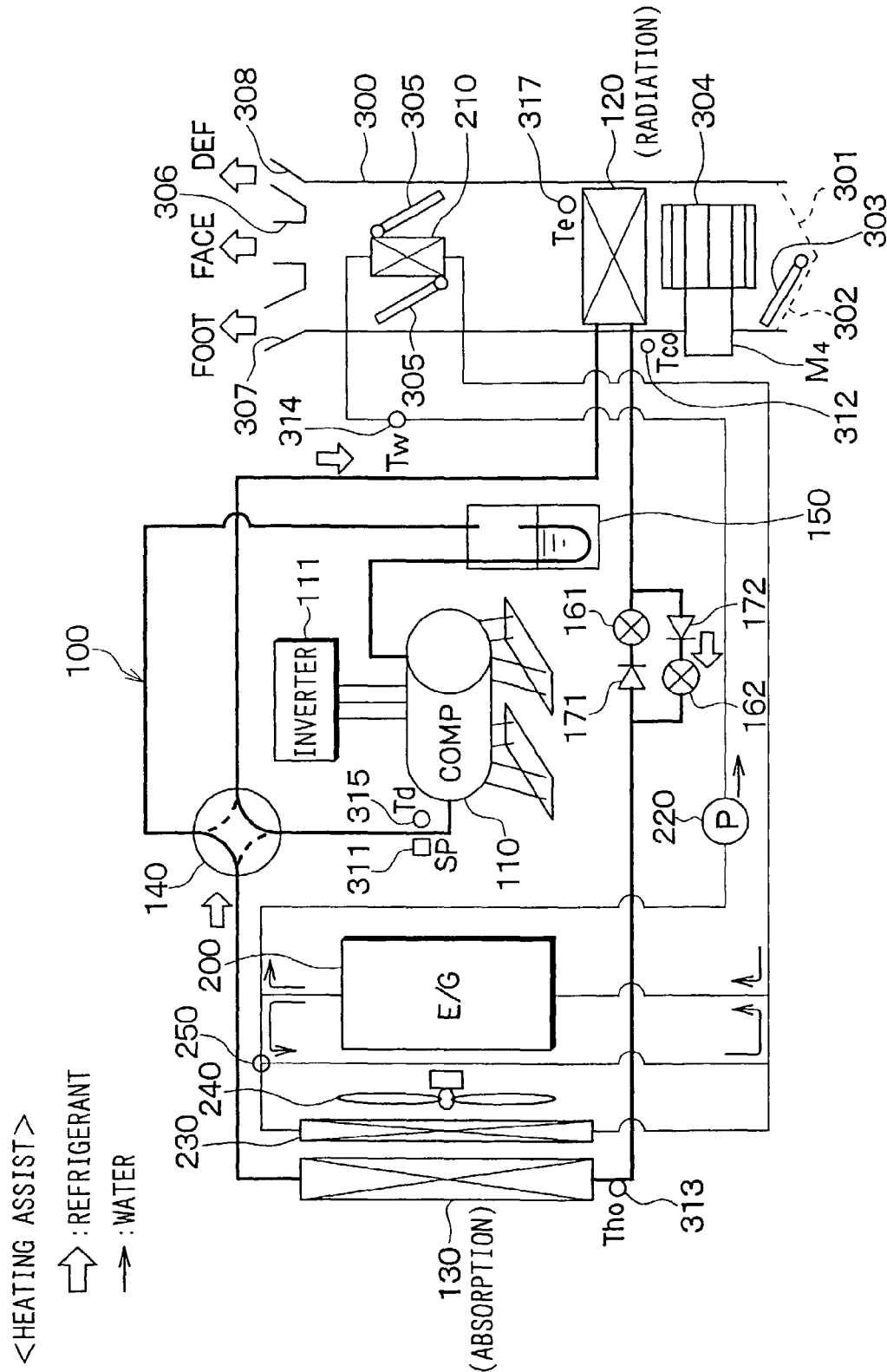
FIG. 5 is a schematic diagram showing the vehicle air conditioner in a heating assist operation, according to the first embodiment.

In the heating assist operation, refrigerant is circulated in the heat pump cycle 100 from the compressor 110 to the compressor 110 through the interior heat exchanger 120, the heating decompression device 162, the exterior heat exchanger 130 and the accumulator 150 in this order. Refrigerant absorbs heat from outside air in the exterior heat exchanger 130, and is condensed. In the interior heat exchanger 120, refrigerant radiates heat to air blown into the passenger compartment. As indicated by arrows in FIG. 5, cooling water circulates while bypassing the radiator 230. Thus, the temperature of cooling water is not decreased in the radiator 230, and the heating capacity of the heater core 210 is increased. As shown in FIG. 5, the air mixing door 305 is fully opened so that all air having passed through the interior heat exchanger 120 passes through the heater core 210 without bypassing.

At step S160 (frost determining means), it is determined whether or not the surface of the exterior heat exchanger 130 is frosted based on the temperature Tho of refrigerant flowing out of the exterior heat exchanger 130, detected by the exterior outlet temperature sensor 313 and the like. When it is determined that the surface of the exterior heat exchanger 130 is not frosted, the compressor 110 is continuously operated. On the other hand, when it is determined that the surface of the exterior heat exchanger is frosted, the water temperature Tw is input at step S170. At step S180 (heating capacity determining means), it is determined whether or not a temperature difference (TWO−Tw) between the target water temperature TWO and the actual water temperature Tw input at step S170 is larger than a predetermined temperature difference C3.

In the first embodiment, when a condition, where a temperature difference ΔT (=Tam−Tho) between the outside air temperature Tam and the exterior outlet refrigerant temperature Tho is larger than a predetermined temperature difference C2 (18° C. in the first embodiment), is continued for a predetermined time T1 or longer, it is determined that the surface of the exterior heat exchanger 130 is frosted. Then, when the temperature difference (TWO−Tw) between the target water temperature TWO and the water temperature Tw is larger than the predetermined temperature difference C3, it is determined that heating operation cannot be performed only by using hot water supplied from the engine 200, and the compressor 110 is continuously operated. When the temperature difference (TWO−Tw) between the target water temperature TWO and the water temperature Tw is equal to or smaller than the predetermined temperature difference C3, it is determined that heating operation can be performed only by using hot water supplied from the engine 200, and a defrosting operation of the exterior heat exchanger is performed at step S190.

In the defrosting operation, as in the cooling operation, refrigerant discharged from the compressor 110 is circulated through the exterior heat exchanger 130, the cooling decompression device 161, the interior heat exchanger 120 and the accumulator 150 in this order, and returns to the compressor 110. At this time, refrigerant absorbs heat from air to be blown into the passenger compartment, in the interior heat exchanger 120, and is evaporated therein. Then, the evaporated refrigerant radiates heat to outside air in the exterior heat exchanger 130, and is condensed in the exterior heat exchanger 130.

Figure 6:
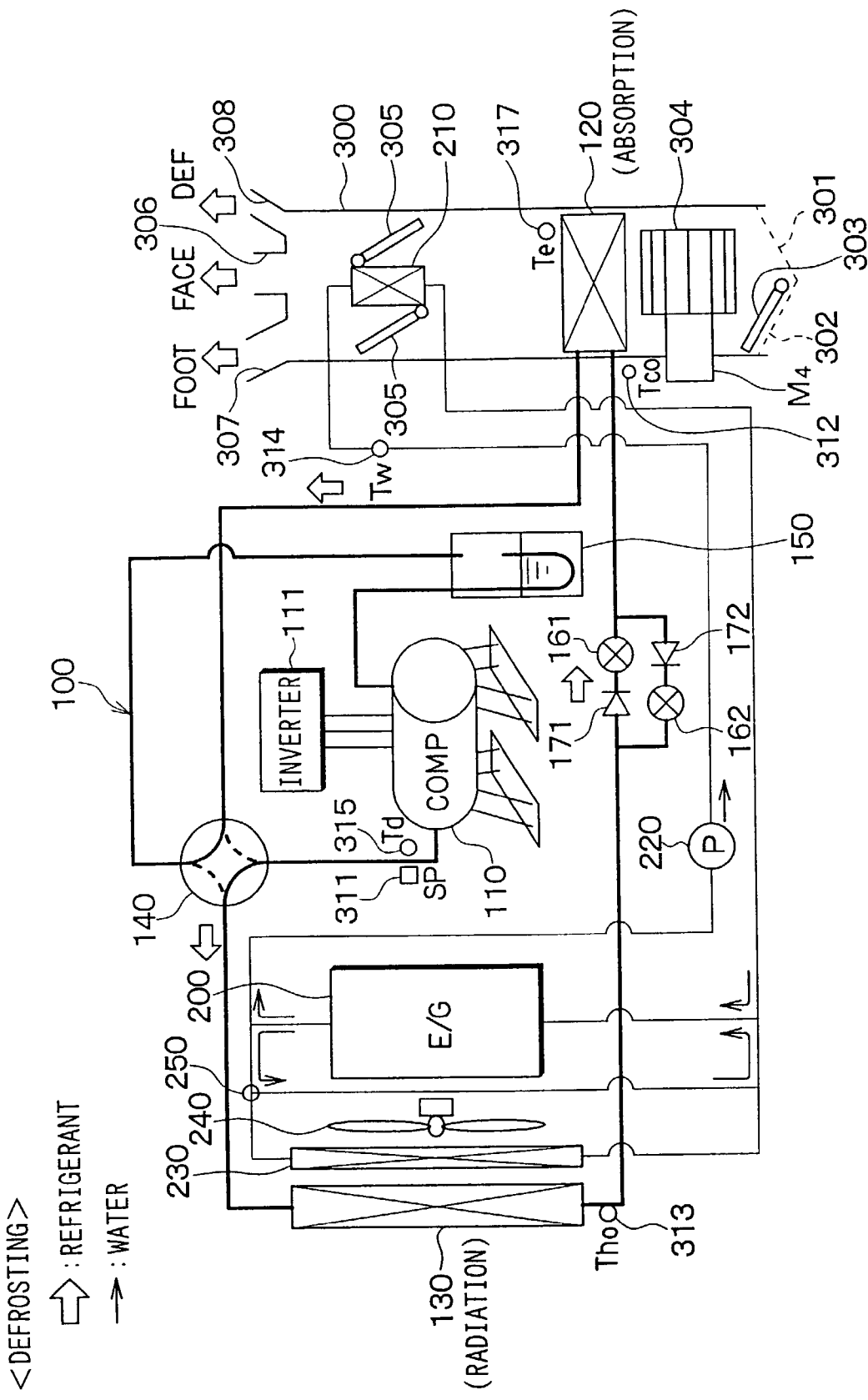
FIG. 6 is a schematic diagram showing the vehicle air conditioner in a defrosting operation, according to the first embodiment.

In the first embodiment, step S180 (heating capacity determining means) is provided. Further, the defrosting operation of the exterior heat exchanger 130 is performed when the temperature of hot water to be supplied to the heater core 210 is higher than a predetermined temperature and when it is determined that the surface of the exterior heat exchanger 130 is frosted. Therefore, sufficient heating feeling can be obtained even in the defrosting operation of the exterior heat exchanger 130. Further, as indicated by arrows in FIG. 6, cooling water circulates between the engine 200 and the heater core 210 while bypassing the radiator 230. Therefore, the temperature of cooling water can be increased, and the heating capacity of the heater core 210 can be increased. Accordingly, sufficient heating feeling can be effectively obtained even during the defrosting operation.

When the operation of the heat pump cycle is switched to the heating assist operation from the defrosting operation, the heating degree of the heater core 21 is increased to be higher than a predetermined heating degree, and air to be blown into the passenger compartment is heated by a large heating capacity so that the air temperature blown into the passenger compartment becomes higher than a predetermined temperature. Therefore, relative humidity of air blown into the passenger compartment is reduced, and the windshield is restricted from being clouded. Specifically, during the heating assist operation (re-heating assist operation) performed until a predetermined time passes after the defrosting operation is ended, the rotational speed of the engine 200 is increased higher than a predetermined rotational speed, so that the water temperature Tw is increased. Thus, the heating degree of the heater core 210 becomes higher than the predetermined heating degree.

Alternatively, in the re-heating assist operation, the amount of hot water to be supplied to the heater core 210 is increased more than a predetermined amount by increasing the rotational speed of the electric pump 220, thereby increasing the heating degree of the heater core 210 higher than the predetermined heating degree. Otherwise, the water temperature Tw can be increased by stopping heat radiation from the radiator 230, or the flow ratio of air passing through the heater core 210 can be maximized by maximizing the open degree SW of the air mixing door 305. Preferably, during the re-heating assist operation, the target air temperature TAO, that is, the target water temperature TWO is set higher than a predetermined temperature, so that the open degree SW of the air mixing door 305 for opening the heater core 210 is made maximum.

Further, in the first embodiment, during the re-heating assist operation, the heating capacity of the interior heat exchanger 120 is restricted, thereby restricting water, condensed on the interior heat exchanger 120 during the defrosting operation, from being evaporated. Specifically, the rotational speed of the compressor 110 is inverter-controlled so that the target interior air temperature TEO is not increased higher than a predetermined temperature only for a predetermined time. Alternatively, the rotational speed of the compressor 110 is inverter-controlled so that the target interior air temperature TEO is gradually increased. Further, during the re-heating assist operation, another mode except for the defroster mode, such as the face mode and the foot mode is selected. Therefore, even when the blown air is humidified by evaporating the condensed water due to heat radiation of the interior heat exchanger 120, it can prevent the humidified air from being directly blown toward the windshield, thereby restricting the windshield from being fogged.

For preventing the windshield from being clouded during re-heating assist operation, outside air having a relative low humidity may be introduced by setting the outside air introduction mode during the re-heating assist operation. However, since outside air having a temperature greatly lower than inside air is introduced, heating load is increased during the re-heating assist operation, and it is necessary to greatly increase the consumed power. When the heating degree of the heater core 210 is increased higher than the predetermined heating degree in the re-heating assist operation as in the first embodiment, the heating load can be effectively reduced. For example, in the re-heating assist operation with an outside air temperature of −20° C., when the outside air introduction mode is selected, the heating load is about 8 kW. However, during the same condition, when the inside air introduction mode is selected in the system of the first embodiment, the heating load can be reduced to about 3 kW.

(Second Embodiment)

Figure 7:
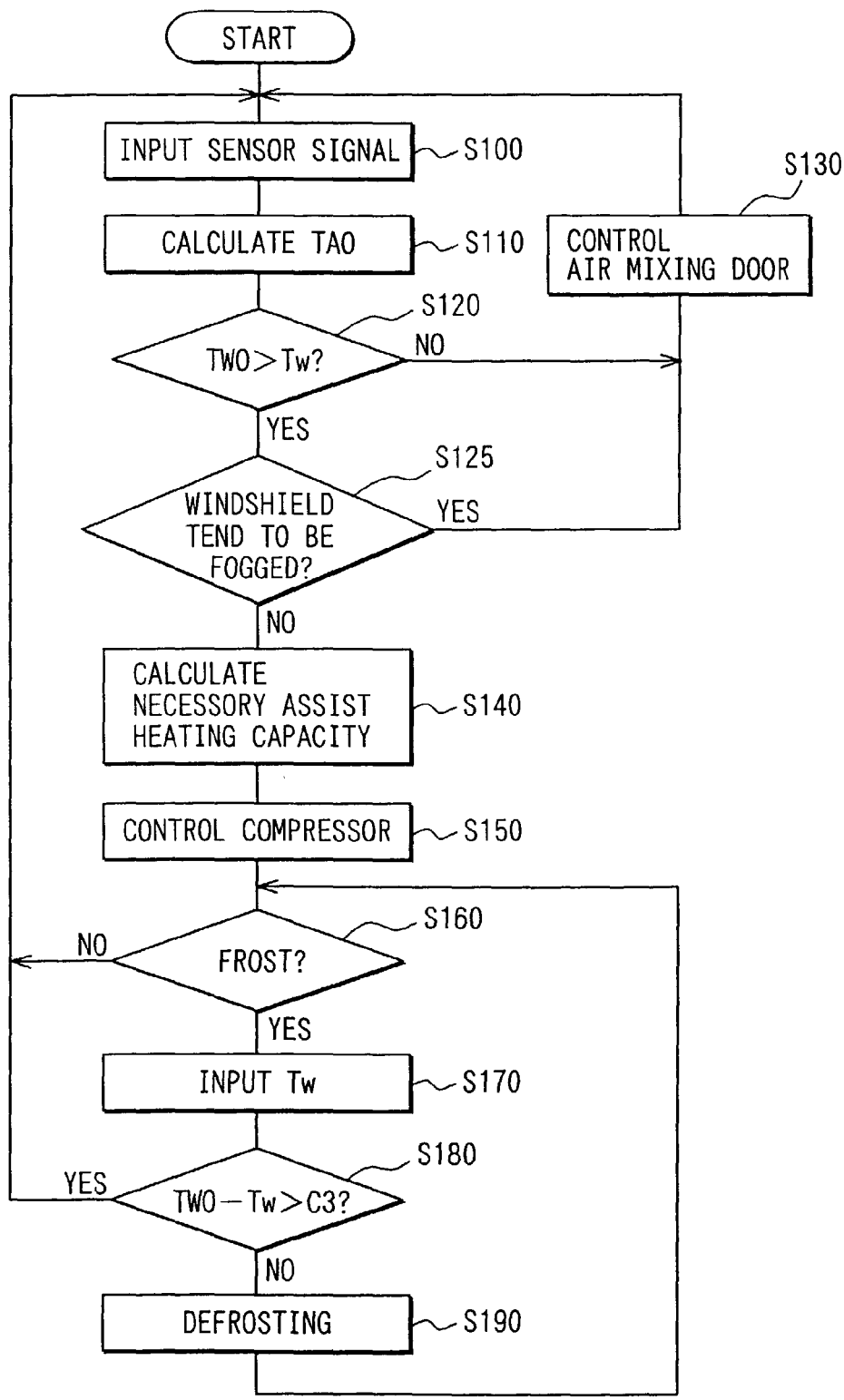
FIG. 7 is a flow diagram showing an operation control of a vehicle air conditioner according to a second embodiment of the present invention.

In the second embodiment, as shown in FIG. 7, step S125 for determining a fogging state of the windshield is added as compared with FIG. 4 described in the first embodiment. That is, at step S125, it is determined whether or not the windshield tends to be clouded (fogged). Only when it is determined that the windshield is difficult to be fogged at step S125, the heating assist operation (re-heating assist operation) is performed at step S140. That is, the re-heating assist operation is switched from the defrosting operation at a time where it is determined that the windshield is difficult to be fogged. Therefore, even when the blown air is humidified by evaporation of the condensed water due to the heat radiation of the interior heat exchanger 120, it can restrict the windshield from being clouded.

Here, as a vehicle speed becomes higher, the windshield is readily cooled by the running wind, and the temperature of the windshield becomes lower. Therefore, at step S125, when the vehicle speed is lower than a predetermined speed, it can be determined that the windshield is difficult to be fogged. Alternatively, when another blow mode except for the defroster mode, such as the face mode and the foot mode is set, it can be determined that the windshield is difficult to be fogged. Alternatively, when a predetermined time passes after the defrosting operation is ended, it is determined that the windshield does not tend to be fogged. In this case, the predetermined time can be set in a time period until an ignition switch for stopping/starting the engine 200 is turned on next time after the defrosting operation is ended.

(Third Embodiment)

Figure 8:
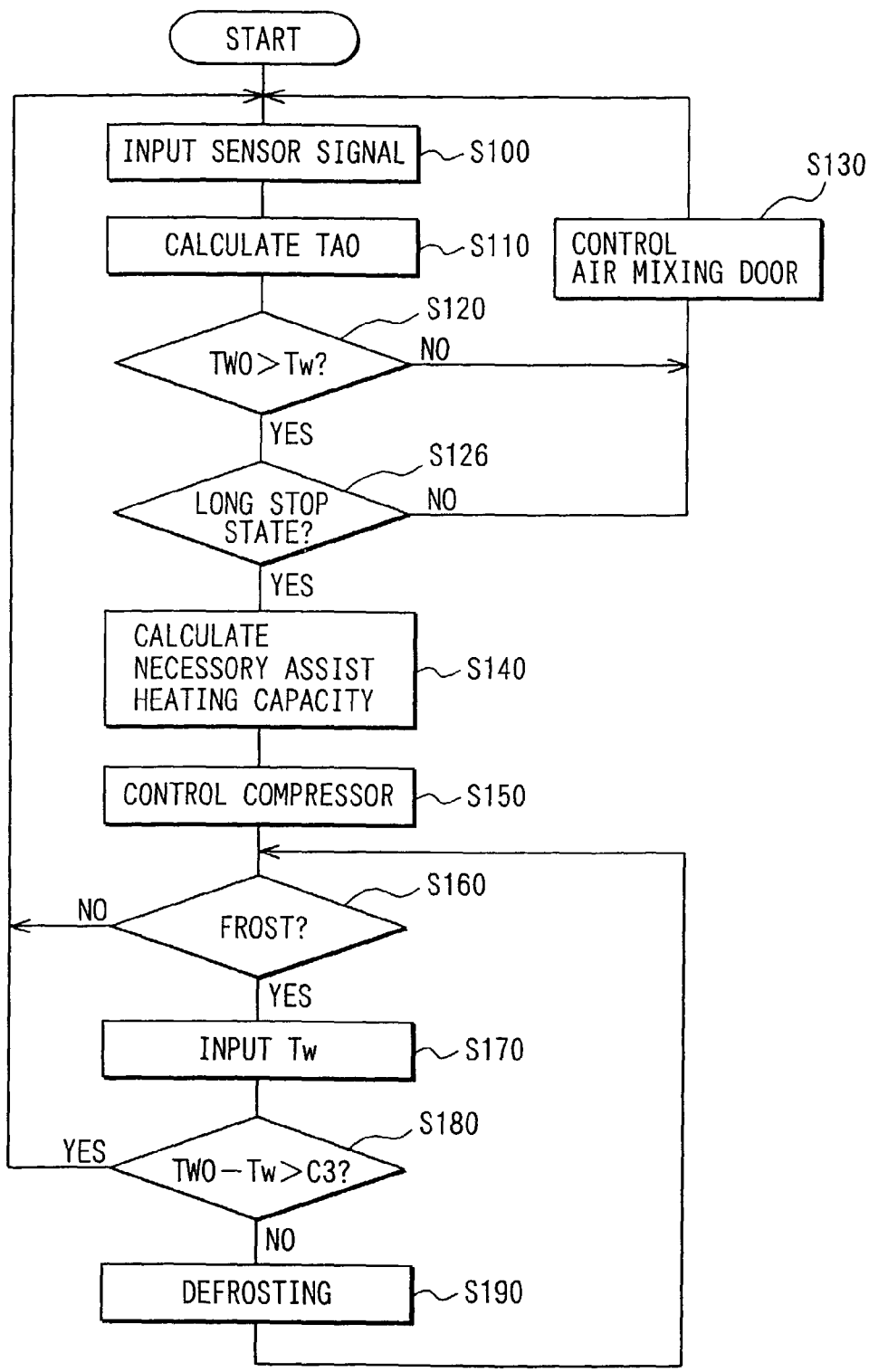
FIG. 8 is a flow diagram showing an operation control of a vehicle air conditioner according to a third embodiment of the present invention.

In the third embodiment, as shown in FIG. 8, step S126 for determining a vehicle stop state is added as compared with FIG. 4 described in the first embodiment. That is, at step S126, it is determined whether or not the vehicle is stopped for a long time longer than a predetermined time. Only when it is determined that the vehicle is stopped for the long time longer than the predetermined time, the heating assist operation (re-heating assist operation) is performed at step S140. For example, the re-heating assist operation is switched from the defrosting operation, when it is determined that the vehicle is stopped for the long time. Therefore, driving safety of the vehicle, due to the fogging of the windshield, can be improved. Specifically, when the ignition switch is turned off, it is determined that the vehicle is stopped for the long time at step S126.

(Fourth Embodiment)

In the fourth embodiment, the rotational speed of the compressor 110 is inverter-controlled so that the temperature of the interior heat exchanger 120 becomes higher than a predetermined temperature (e.g., a dew point of air to be heat-exchanged in the interior heat exchanger 120), during the defrosting operation. Therefore, the heat absorption amount of the interior heat exchanger 120 is reduced during the defrosting operation, it can restrict condensed water from being generated on the interior heat exchanger 120, and it can restrict the windshield from being fogged during the heating assist operation. That is, when the heat absorption amount of the interior heat exchanger 120 is reduced during the defrosting operation, it can restrict the condensed water from adhering on the interior heat exchanger 120, thereby restricting the windshield from being fogged during the re-heating assist operation.

Figure 9:
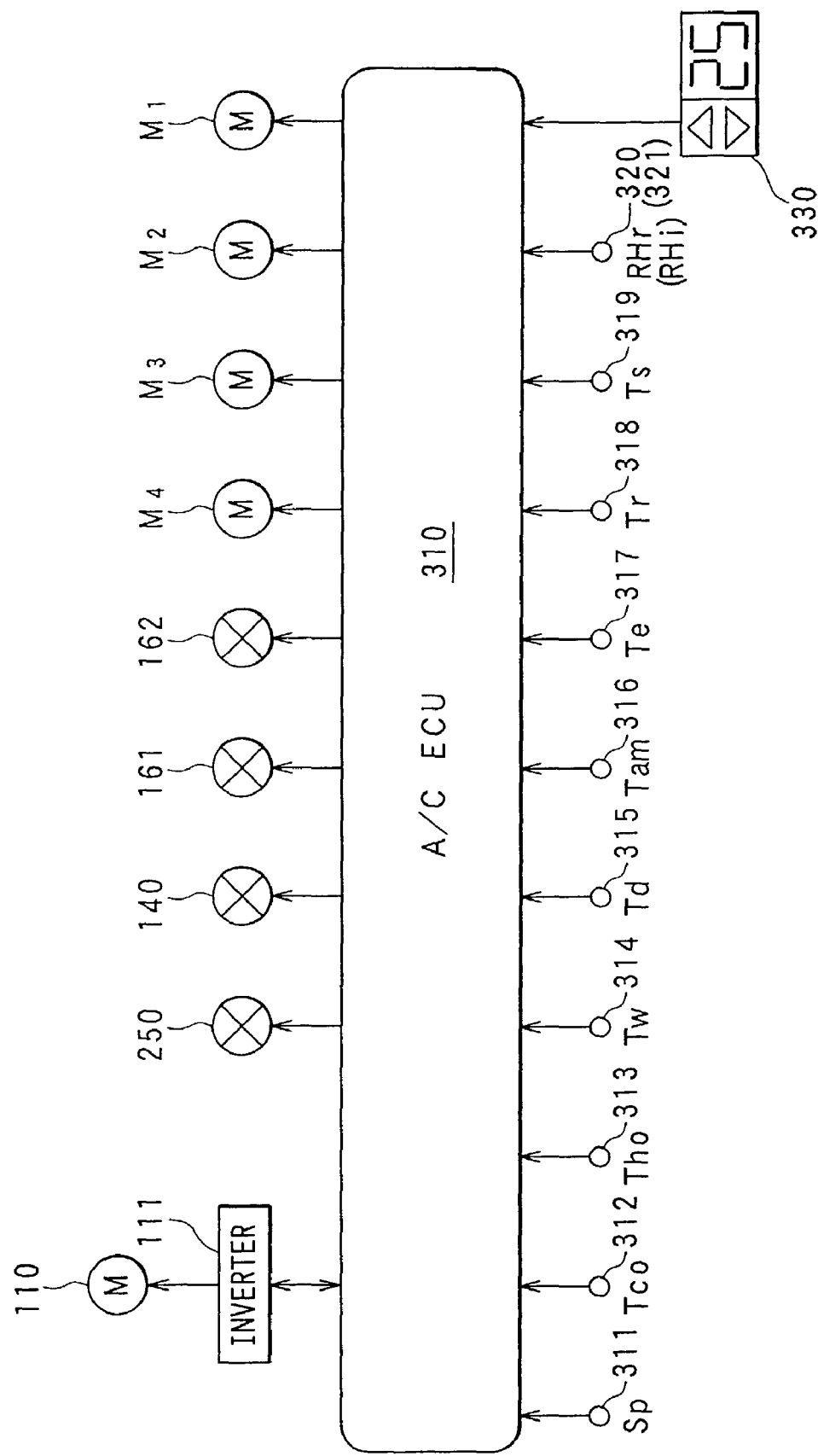
FIG. 9 is a schematic diagram showing a control unit (ECU) of a vehicle air conditioner according to a fourth embodiment of the present invention.

In FIG. 9, a relative humidity RHr of air in the passenger compartment is detected by a humidity sensor 320, and the dew point is calculated based on the relative humidity RHr and the inside air temperature Tr. Alternatively, a relative humidity RHi of air directly after passing through the interior heat exchanger 120 is detected by a humidity sensor 321, and the dew point is calculated based on the relative humidity RHi and the temperature Te of air directly after passing through the interior heat exchanger 120.

When the condensed water is not generated on the interior heat exchanger 120, absolute humidity of air in the passenger compartment is uniform regardless of either of the outside air introduction mode and the inside air introduction mode. Therefore, the dew point in the passenger compartment is uniform, and can be calculated based on relative humidity of air at any part in the passenger compartment, such as the relative humidity RHr, RHi.

In the fourth embodiment, the predetermined temperature can be set based on the outside air temperature Tam and the inside air temperature Tr, detected by the outside air temperature sensor 316 and the inside air temperature sensor 318.

(Fifth Embodiment)

Figure 10:
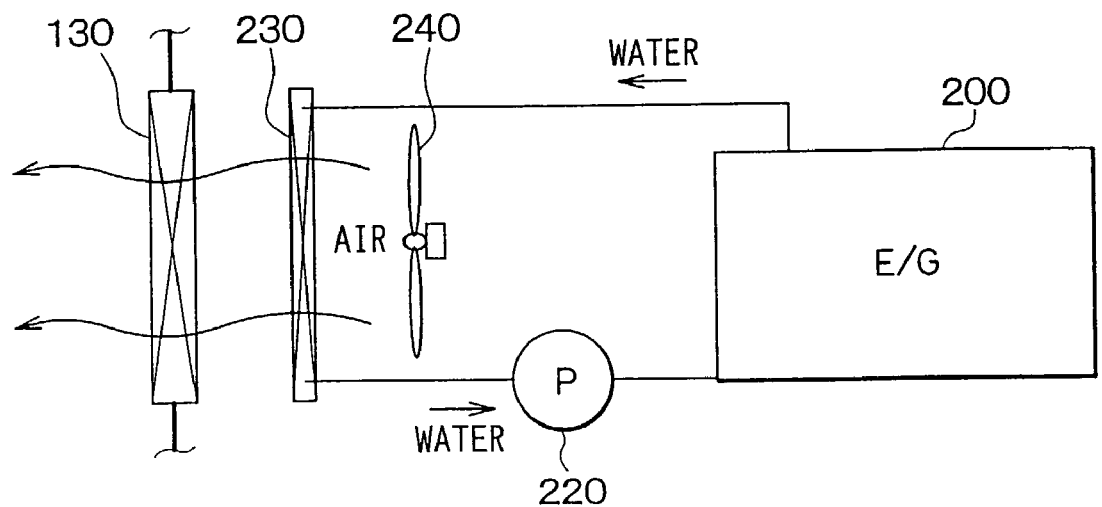
FIG. 10 is a schematic diagram showing a part of a vehicle air conditioner according to a fifth embodiment of the present invention.

In the above-described first through fourth embodiments of the present invention, the defrosting operation of the exterior heat exchanger 130 is performed by radiating heat in the exterior heat exchanger 130. However, in the fifth embodiment, the defrosting operation is performed by the exhaust heat generated in the vehicle. Specifically, as shown in FIG. 10, the defrosting operation is performed using heat radiated from the radiator 230. Directly after stopping the vehicle, for example, directly after the ignition switch is turned off, cooling water is circulated to flow into the radiator 230 as indicated by arrows in FIG. 10, using the electric pump 220 and the water switching valve 250.

Figure 11:
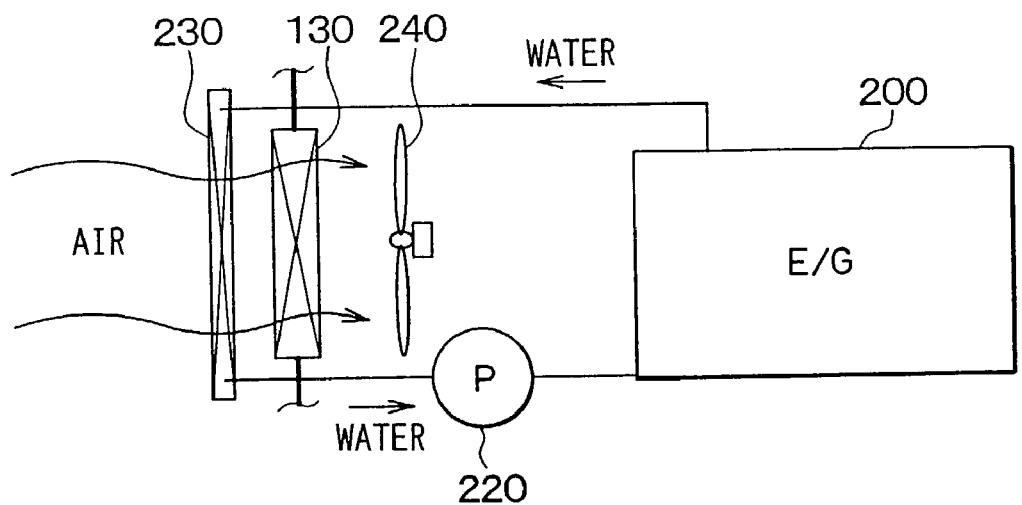
FIG. 11 is a schematic diagram showing a part of a vehicle air conditioner according to the fifth embodiment.

Further, directly after stopping the vehicle, air is blown by the electric exterior fan 240 from the radiator 230 to the exterior heat exchanger 130. When the electric exterior fan 240, the radiator 230 and the exterior heat exchanger 130 are disposed in this order in a stack direction as shown in FIG. 10, the electric exterior fan 240 is operated to discharge air to the radiator 240 and the exterior heat exchanger 130. On the other hand, when the electric exterior fan 240, the exterior heat exchanger 130 and the radiator 230 are disposed in this order in the stack direction as shown in FIG. 11, the electric exterior fan 240 is operated to suck air from the radiator 230 and the exterior heat exchanger 130. During the defrosting operation, the compressor 110 is stopped, or is operated at a very low rotational speed.

Accordingly, the operation of the heat pump cycle 100 is unnecessary during the defrosting operation, and driving electric power required for the compressor 110 can be reduced to zero or a very small amount, thereby largely reducing electric power consumed in the defrosting operation. Further, in the fifth embodiment, the defrosting operation can be realized without requiring new components and changing the existent structure.

(Sixth Embodiment)

Figure 12:
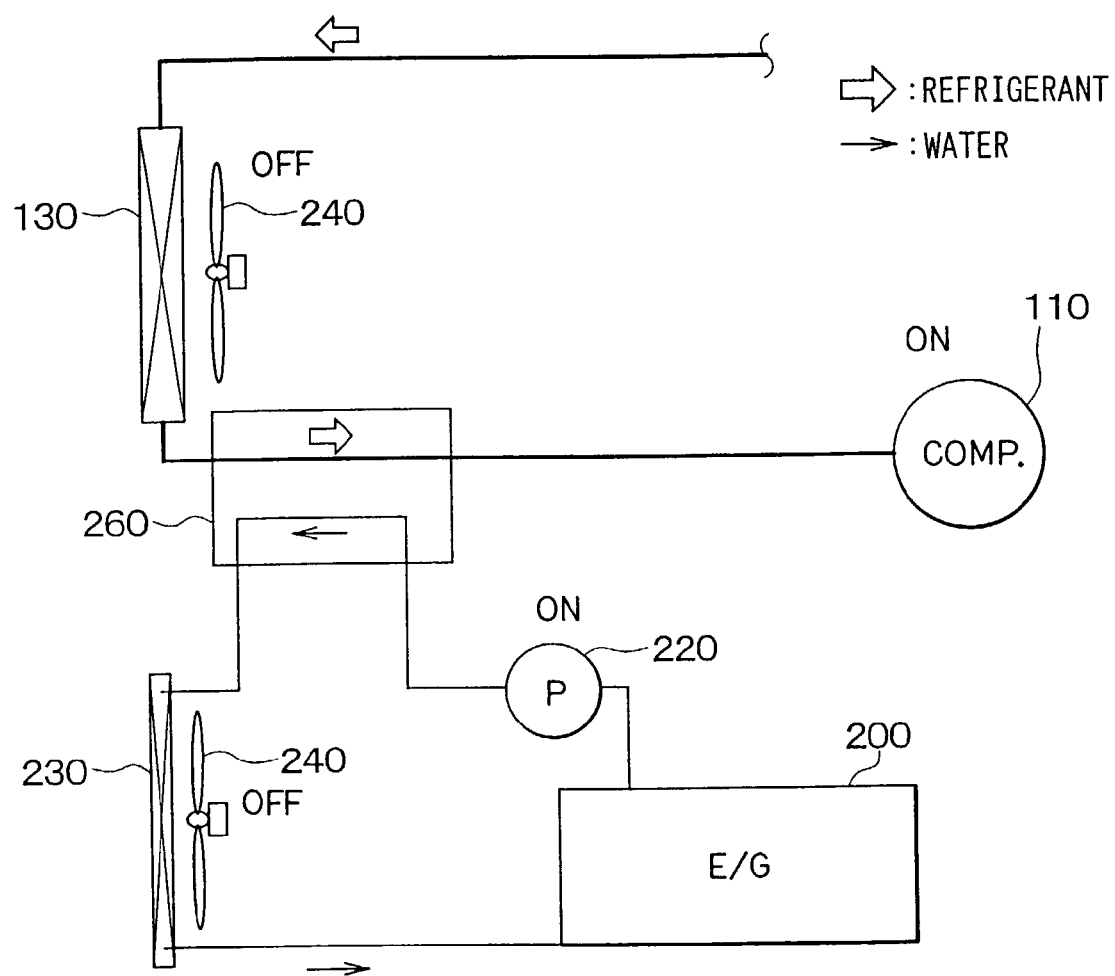
FIG. 12 is a schematic diagram showing a part of a vehicle air conditioner according to a sixth embodiment of the present invention.

In the sixth embodiment, the defrosting operation is performed by the exhaust heat generated in the vehicle not through the radiator 230 as in the fifth embodiment, but through a water-refrigerant heat exchanger 260 shown in FIG. 12. As shown in FIG. 12, heat exchange between cooling water and refrigerant is performed in the water-refrigerant heat exchanger 260, so that heat of cooling water heated using the exhaust heat of the vehicle is transmitted to refrigerant in the water-refrigerant heat exchanger 260, and the defrosting operation is performed by using the heat transmitted to refrigerant from cooling water.

Specifically, directly after stopping the vehicle, cooling water is circulated to flow into the radiator 230 as indicated by arrows in FIG. 12 by the electric pump 220 and the water switching valve 250. At the same time, the compressor 110 is driven, and refrigerant is heated by the water-refrigerant heat exchanger 260. In this case, the rotational speed of the compressor 110 is set at a low rotational speed (e.g., 600 rpm) where the heat transmitted to refrigerant can be circulated into the exterior heat exchanger 130. In the defrosting operation, the operation of the electric exterior fan 240 is stopped. Further, as indicated by arrows in FIG. 12, a flow direction of cooling water and a flow direction of refrigerant are set opposite to each other in the water-refrigerant heat exchanger 260, thereby improving heat-exchange efficiency in the water-refrigerant heat exchanger.

(Seventh Embodiment)

Figure 13A:
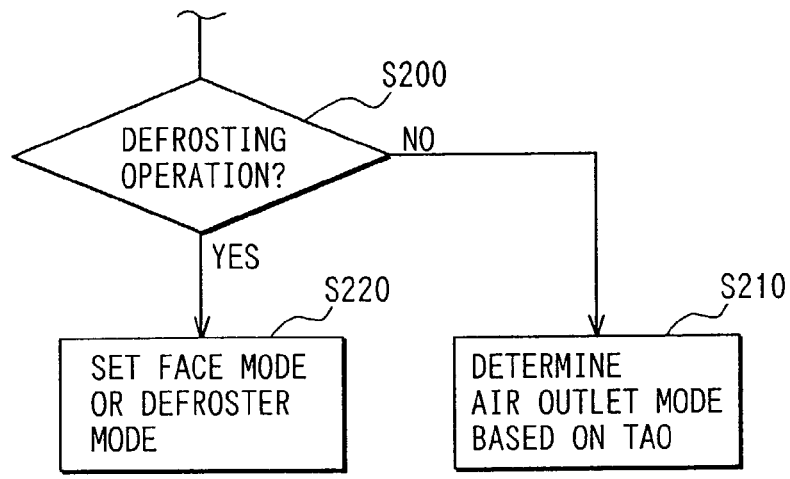
FIG. 13A is a flow diagram showing a control for determining an air outlet mode in a defrosting operation of an exterior heat exchanger.

In the above-described first to fourth embodiments, since the defrosting operation is performed by radiating heat in the exterior heat exchanger 130, heat is absorbed in the interior heat exchanger 120 during the defrosting operation. Therefore, air to be blown into the passenger compartment is cooled by the interior heat exchanger 120. Especially, when a heating capacity of the heater core 210 is low, cold air not fitting a passenger feeling is blown into the passenger compartment. In the seventh embodiment, when the defrosting operation of the exterior heat exchanger 130 is determined at step S200 in FIG. 13A, the blow mode (air outlet mode) is switched to a mode, where the amount of air blown from the foot opening 307 is small or zero, such as the face mode and the defroster mode as shown in FIG. 13A, thereby restricting uncomfortable feeling of the passenger. On the other hand, when the defrosting operation of the exterior heat exchanger 130 is not determined at step S200, the air outlet mode is set based on the target air temperature TAO.

Figure 13B:
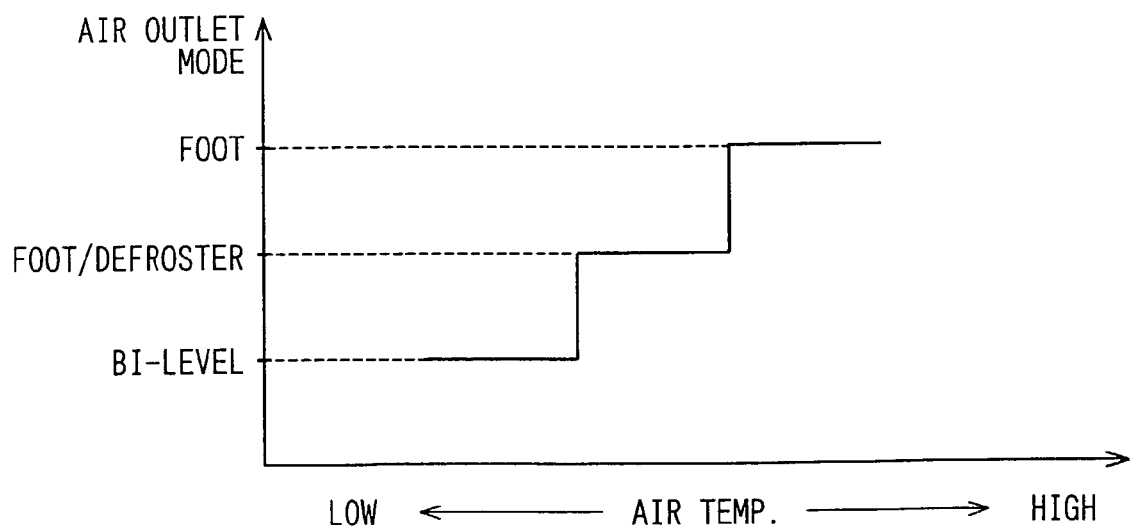
FIG. 13B is a graph showing a control for determining the air outlet mode in the defrosting mode, according to a seventh embodiment of the present invention.

Further, an amount of air blown from the foot opening 307 is made smaller as the air outlet mode is set at the foot mode, the foot/defroster mode and the bi-level mode in this order. Therefore, in the defrosting operation, as the temperature of air to be blown into the passenger compartment becomes higher from a low temperature, the air outlet mode is switched to the bi-level mode, the foot/defroster mode and the foot mode in this order, as shown in FIG. 13B.

Although the present invention has been fully described in connection with the preferred embodiments thereof with reference to the accompanying drawings, it is to be noted that various changes and modifications will become apparent to those skilled in the art.

For example, in order to prevent the windshield from being clouded during the re-heating assist operation, the heating degree of the heater core 210 is increased higher than the predetermined heating degree during the re-heating assist operation in the first embodiment. In the second embodiment, the re-heating assist operation is performed when it is determined that the windshield is difficult to be clouded. In the third embodiment, the re-heating assist operation is performed when it is determined that the vehicle is stopped for the long time. In the fourth embodiment, the temperature of the interior heat exchanger 120 is increased higher than the predetermined temperature during the defrosting operation. In the seventh embodiment, the blow mode (air outlet mode) is switched to a mode where the amount of air blown from the foot opening 307 is small or zero during the defrosting operation. These embodiments can be suitably combined to prevent the windshield from being clouded during the re-heating assist operation.

In the first, second, fourth and fifth embodiments, the compressor 110 may be driven by the engine 200 without being limited to electric power. Further, a heat source for the heater core 210 may be a fuel cell mounted on a vehicle without being limited to the vehicle engine 200.

Further, the heat pump cycle 100 may be constructed by a supper-critical refrigerant cycle system using carbon dioxide ($CO_2$) as refrigerant. In the supper-critical refrigerant cycle system, a high-pressure side refrigerant pressure becomes higher than the critical pressure of refrigerant. In this case, the high-pressure side refrigerant is not condensed and radiates heat in a gas state in the interior heat exchanger 120, during the defrosting operation of the heat pump cycle 100.

In the first, second, fourth and fifth embodiments, the pump 220 for circulating cooling water may not be electrically driven as in the above embodiments, but may be mechanically driven while rotational force of a crankshaft of the engine 200 is transmitted to the pump 220 through a belt and the like. Otherwise, both of an electrical pump and a mechanical pump may be provided as the pump 220.

Such changes and modifications are to be understood as being within the scope of the present invention as defined by the appended claims.

What is claimed is:

1. An air conditioner for a vehicle, comprising:

a heater core for heating air to be blown into a passenger compartment by performing a heat-exchange between the air and a fluid supplied into the heater core, the fluid having recovered exhaust heat generated in the vehicle;

a heat pump cycle including an interior heat exchanger for performing a heat-exchange between a refrigerant and the air to be blown into the passenger compartment, and an exterior heat exchanger for performing a heat-exchange between the refrigerant and outside air; and a control unit for controlling operation of the heat pump cycle to switch to one of a heating assist operation where the interior heat exchanger radiates heat to heat the air together with the heater core, and a defrosting operation where the exterior heat exchanger is defrosted using heat radiated from the exterior heat exchanger while the interior heat exchanger absorbs heat from the air, wherein:

the control unit sets a predetermined heating degree to maintain a desired temperature in the passenger compartment;

the control unit sets an increased heating degree of the heater core which is higher than the predetermined heating degree when the operation of the heat pump cycle is switched to the heating assist operation from the defrosting operation;

the fluid supplied into the heater core is cooling water for cooling an engine mounted on the vehicle; and when the operation of the heat pump cycle is switched to the heating assist operation from the defrosting operation, the increased heating degree of the heater core is set by increasing a rotational speed of the engine.

2. An air conditioner for a vehicle, comprising:

a heater core for heating air to be blown into a passenger compartment by performing a heat-exchange between the air and a fluid supplied into the heater core, the fluid having recovered exhaust heat generated in the vehicle;

a heat pump cycle including an interior heat exchanger for performing a heat-exchange between a refrigerant and the air to be blown into the passenger compartment, and an exterior heat exchanger for performing a heat-exchange between the refrigerant and outside air; and a control unit for controlling operation of the heat pump cycle to switch to one of a heating assist operation where the interior heat exchanger radiates heat to heat the air together with the heater core, and a defrosting operation where the exterior heat exchanger is defrosted using heat radiated from the exterior heat exchanger while the interior heat exchanger absorbs heat from the air, wherein:

the control unit sets a predetermined heating degree to maintain a desired temperature in the passenger compartment;

the control unit sets an increased heating degree of the heater core which is higher than the predetermined heating degree when the operation of the heat pump cycle is switched to the heating assist operation from the defrosting operation;

when the operation of the heat pump cycle is switched to the heating assist operation from the defrosting operation, the increased heating degree of the heater core is set by increasing a flow amount of fluid supplied into the heater core.

3. An air conditioner for a vehicle, comprising:

a heater core for heating air to be blown into a passenger compartment by performing a heat-exchange between the air and a fluid supplied into the heater core, the fluid having recovered exhaust heat generated in the vehicle;

a heat pump cycle including an interior heat exchanger for performing a heat-exchange between a refrigerant and the air to be blown into the passenger compartment, and an exterior heat exchanger for performing a heat-exchange between the refrigerant and outside air; and a control unit for controlling operation of the heat pump cycle to switch to one of a heating assist operation where the interior heat exchanger radiates heat to heat the air together with the heater core, and a defrosting operation where the exterior heat exchanger is defrosted using heat radiated from the exterior heat exchanger while the interior heat exchanger absorbs heat from the air, wherein:

the control unit sets a predetermined heating degree to maintain a desired temperature in the passenger compartment;

the control unit sets an increased heating degree of the heater core which is higher than the predetermined heating degree when the operation of the heat pump cycle is switched to the heating assist operation from the defrosting operation;

a radiator for cooling the fluid by performing a heat exchange between the fluid and outside air, wherein:

the fluid is cooling water for cooling an engine mounted on the vehicle; and when the operation of the heat pump cycle is switched to the heating assist operation from the defrosting operation, cooling water bypasses the radiator so that the heating degree of the heater core becomes higher than the predetermined heating degree.

4. An air conditioner for a vehicle, comprising:

a heater core for heating air to be blown into a passenger compartment by performing a heat-exchange between the air and a fluid supplied into the heater core, the fluid having recovered exhaust heat generated in the vehicle;

a heat pump cycle including an interior heat exchanger for performing a heat-exchange between a refrigerant and the air to be blown into the passenger compartment, and an exterior heat exchanger for performing a heat-exchange between the refrigerant and outside air; and a control unit for controlling operation of the heat pump cycle to switch to one of a heating assist operation where the interior heat exchanger radiates heat to heat the air together with the heater core, and a defrosting operation where the exterior heat exchanger is defrosted using heat radiated from the exterior heat exchanger while the interior heat exchanger absorbs heat from the air, wherein:

the control unit sets a predetermined heating degree of the heater core and the interior heat exchanger to maintain a desired temperature in the passenger compartment;

the control unit continuously operates the heat pump cycle and sets an increased heating degree of the heater core which is higher than the predetermined heating degree of the heater core when the operation of the heat pump cycle is switched to the heating assist operation from the defrosting operation.

5. The air conditioner according to claim 4, further comprising an air mixing door for adjusting a temperature of air blown into the passenger compartment by adjusting a flow ratio of an air amount passing through the heater core to an air amount passing the interior heat exchanger, wherein when the operation of the heat pump cycle is switched to the heating assist operation from the defrosting operation, the flow ratio of the air mixing door is increased to be higher than a predetermined ratio to increase the heating degree of the heater core.

6. The air conditioner according to claim 4, wherein:
when the operation of the heat pump cycle is switched to the heating assist operation from the defrosting operation, a target temperature of air to be blown into a passenger compartment of the vehicle is set higher than a predetermined temperature to increase the heating degree of the heater core.

7. The air conditioner according to claim 4, wherein:
the control unit has a mode setting member for setting one of a defroster mode where air is blown into the passenger compartment toward a front windshield of the vehicle and an other mode where air is blown into the passenger compartment toward a seat side different from the front windshield;
when the operation of the heat pump cycle is switched to the heating assist operation from the defrosting operation, the other mode is set by the mode setting member.

8. The air conditioner according to claim 4, wherein:
in the defrosting operation, the control unit controls the operation of the heat pump cycle such that temperature of the interior heat exchanger becomes higher than a set temperature.

9. The air conditioner according to claim 4, wherein:
the control unit has fogging determining means for determining whether or not a windshield of the vehicle is difficult to be fogged; and
when the fogging determining means determines that the windshield is difficult to be fogged, it is determined that a condition for switching the operation of the heat pump cycle from the defrosting operation to the heating assist operation is satisfied.

10. The air conditioner according to claim 4, wherein:
the control unit has stop-state determining means for determining whether or not the vehicle is stopped longer than a predetermined time period;
when the stop-state determining means determines that the vehicle is stopped longer than the predetermined time, it is determined that a condition for switching the operation of the heat pump cycle from the defrosting operation to the heating assist operation is satisfied.

11. The air conditioner according to claim 4, wherein the control unit sets the increased heating degree for a predetermined time after the switching of the operation of the heat pump cycle from the defrosting operation to the heating assist operation.

12. The air conditioner according to claim 4, further comprising:
a first adjusting means for adjusting the heating degree of the heater core; and
a second adjusting means for adjusting the heating degree of the heater core, the second adjusting means being capable of increasing the heating degree of the heater core in addition to the heating degree obtained by the first adjusting means; wherein
the control unit controls the first adjusting means to obtain the predetermined heating degree when the operation of the heat pump cycle is in the heating assist operation before switching to the defrosting operation, and
the control unit controls both the first and the second adjusting means to obtain the increased heating degree when the operation of the heat pump cycle is switched to the heating assist operation from the defrosting operation.

13. The air conditioner according to claim 4, wherein the control unit controls the heat pump cycle to be operated in the defrosting operation when it is determined that the exterior heat exchanger is frosted and a heating operation for the passenger compartment is performed only by using the heater core.

14. The air conditioner according to claim 4, wherein the control unit automatically sets the increased heating degree of the heater core.

15. The air conditioner according to claim 14, wherein the control unit immediately sets an increased heating degree of the heater core when the operation of the heat pump cycle is switched to the heating assist operation from the defrosting operation.

16. The air conditioner according to claim 4, wherein the control unit immediately sets an increased heating degree of the heater core when the operation of the heat pump cycle is switched to the heating assist operation from the defrosting operation.

17. An air conditioner for a vehicle, comprising:
a heater core for heating air to be blown into a passenger compartment by performing a heat-exchange between the air and a fluid supplied into the heater core, the fluid having recovered exhaust heat generated in the vehicle;
a heat pump cycle including an interior heat exchanger for performing a heat-exchange between a refrigerant and the air to be blown into the passenger compartment, and an exterior heat exchanger for performing a heat-exchange between the refrigerant and outside air; and
a control unit for controlling operation of the heat pump cycle to switch one of a heating assist operation where the interior heat exchanger radiates heat to heat the air together with the heater core, and a defrosting operation where the exterior heat exchanger is defrosted using heat radiated from the exterior heat exchanger while the interior heat exchanger absorbs heat from the air, wherein:
the control unit controls the heat pump cycle to be operated in the heating assist operation when it is determined that the recovered exhaust heat amount is deficient for heating air in the heater core, and to be operated in the defrosting operation when it is determined that the exterior heat exchanger is frosted; and
the control unit sets a heating degree of the heater core and the interior heat exchanger at a predetermined heating degree to maintain a desired temperature in the passenger compartment when the operation of the heat pump cycle is in the heating assist operation before switching to the defrosting operation, and the control unit continuously operates the heat puma cycle and sets the heating degree of the heater core at an increased heating degree of the heater core which is higher than the predetermined heating degree when the operation of the heat pump cycle is switched to the heating assist operation from the defrosting operation.

18. The air conditioner according to claim 17, wherein the control unit automatically sets the increased heating degree of the heater core.

19. The air conditioner according to claim 18, wherein the control unit immediately sets an increased heating degree of the heater core when the operation of the heat pump cycle is switched to the heating assist operation from the defrosting operation.

20. The air conditioner according to claim 17, wherein the control unit immediately sets an increased heating degree of the heater core when the operation of the heat pump cycle is switched to the heating assist operation from the defrosting operation.

* * * * *